(12) United States Patent
Daikuhara

(10) Patent No.: US 8,714,836 B2
(45) Date of Patent: May 6, 2014

(54) OPTICAL/ELECTRICAL COMPOSITE CONNECTOR AND MANUFACTURING METHOD THEREOF

(75) Inventor: Osamu Daikuhara, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 371 days.

(21) Appl. No.: 12/849,891

(22) Filed: Aug. 4, 2010

(65) Prior Publication Data

US 2011/0033155 A1 Feb. 10, 2011

(30) Foreign Application Priority Data

Aug. 7, 2009 (JP) .................................. 2009-184321

(51) Int. Cl.
G02B 6/38 (2006.01)
(52) U.S. Cl.
USPC .......................................................... 385/72
(58) Field of Classification Search
None
See application file for complete search history.

(56) References Cited

U.S. PATENT DOCUMENTS

| 5,574,815 | A  | * | 11/1996 | Kneeland ........................ 385/101 |
| 7,151,871 | B2 | * | 12/2006 | Tanaka ............................. 385/33 |
| 7,458,732 | B2 |   | 12/2008 | Harano et al. |
| 7,767,957 | B2 | * | 8/2010  | Viehmann ................ 250/227.11 |
| 2001/0016102 | A1 | | 8/2001 | De Marchi |

FOREIGN PATENT DOCUMENTS

| JP | 2001-283967 | 10/2001 |
| JP | 4082440 | 2/2008 |

* cited by examiner

Primary Examiner — Tina Wong
(74) Attorney, Agent, or Firm — IPUSA, PLLC

(57) ABSTRACT

In an optical/electrical composite connector including a male connector and a female connector, the male connector includes a ferrule provided at an end portion of an optical fiber on a side of the male connector which is connected to the female connector, and an electrode terminal. The female connector includes a core to transmit an optical signal, a cladding to cover the core, an electric wiring provided on an outer wall surface of the cladding, a sleeve in which the ferrule is fitted, the sleeve provided at an end portion of the cladding on a side of the female connector which is connected to the male connector, and a lens provided in the sleeve. When the ferrule and the sleeve are fitted together, the electrode terminal and the electric wiring are electrically connected and the optical fiber and the core are optically connected through the lens.

5 Claims, 6 Drawing Sheets

OPTICAL/ELECTRICAL COMPOSITE CONNECTOR AND MANUFACTURING METHOD THEREOF

BACKGROUND OF THE INVENTION

1. Field of the Invention

The present disclosure relates to an optical/electrical composite connector and a method of manufacturing an optical/electrical composite connector.

2. Description of the Related Art

An optical fiber communication is a modern form of telecommunication which uses an optical signal carried on an optical fiber as a channel for signal transmission and is aimed at a high-speed, noise-proof signal transmission with a reduced amount of communication hardware resources. The optical signal is transmitted via the optical fiber, and an optical connector is used in order to connect the optical fiber and a transmitter which transmits the optical signal or to connect the optical fiber and a receiver which receives the optical signal.

On the other hand, when making connection of the optical fiber and either the transmitter or the receiver by the optical connector, there may be some cases in which making connection of electric wiring simultaneously is also required. For example, in a case where power must be supplied to a transmitter or receiver device which transmits or receives the optical signal but does not include a power supply, and in a case where a low-speed electrical signal is transmitted for telecommunication, making the connection of electric wiring simultaneously is required.

In such cases, two kinds of connectors, a connector for optical fiber connection and a connector for electric wiring connection may be used in combination. However, using the two kinds of connectors will raise the cost. Because it is difficult to make the optical fiber connection and the electric wiring connection simultaneously, a complicated form of connection will be required.

To eliminate the problem, an optical/electrical composite connector having a composition that a connector for optical fiber connection and a connector for electric wiring connection are unified has been proposed. For example, Japanese Laid-Open Patent Publication No. 2001-283967 and Japanese Patent No. 4082440 disclose an optical/electrical composite connector of this type.

However, when a connector for optical fiber connection and a connector for electric wiring connection are unified, the alignment accuracy of electric wiring and the alignment accuracy of optical fiber communication considerably differ from each other, and the number of parts needed is also increased. For this reason, it is difficult to obtain an optical/electrical composite connector which can make the optical fiber connection and the electric wiring connection simultaneously, with low cost.

SUMMARY OF THE INVENTION

In one aspect, the present disclosure provides an optical/electrical composite connector which can make the optical fiber connection and the electric wiring connection simultaneously, with low cost.

In an embodiment which solves or reduces one or more of the above-mentioned problems, the present disclosure provides an optical/electrical composite connector including a male connector and a female connector for making an optical fiber connection and an electric wiring connection, the male connector including: a ferrule provided at an end portion of an optical fiber on a side of the male connector which is connected to the female connector; and an electrode terminal, the female connector including: a core to transmit an optical signal; a cladding to cover the core; an electric wiring provided on an outer wall surface of the cladding; a sleeve in which the ferrule of the male connector is fitted, the sleeve provided at an end portion of the cladding on a side of the female connector which is connected to the male connector; and a lens provided in the sleeve, wherein, when the ferrule and the sleeve are fitted together, the electrode terminal of the male connector and the electric wiring of the female connector are electrically connected and the optical fiber of the male connector and the core of the female connector are optically connected through the lens.

In an embodiment which solves or reduces one or more of the above-mentioned problems, the present disclosure provides a method of manufacturing an optical/electrical composite connector for making an optical fiber connection and an electric wiring connection, the method including: forming an underclad having a groove by injection molding using a metal mold in which an electric wiring is disposed; applying a core material to the groove of the underclad; sticking an overclad to the underclad so that the core material applied to the groove is covered by the overclad; and curing the core material, wherein, in the forming the underclad, a lens for the optical fiber connection and a sleeve for connecting the female connector to the male connector are formed using a same resin material.

In an embodiment which solves or reduces one or more of the above-mentioned problems, the present disclosure provides a method of manufacturing an optical/electrical composite connector for making an optical fiber connection and an electric wiring connection, the method including: forming an underclad having a groove by injection molding; forming an electric wiring on an outer wall of the underclad; applying a core material to the groove of the underclad; sticking an overclad to the underclad so that the core material applied to the groove is covered by the overclad; and curing the core material, wherein, in the forming the underclad, a lens for the optical fiber connection and a sleeve for connecting the female connector to the male connector are formed using a same resin material.

Other objects, features and advantages of the present disclosure will become more apparent from the following detailed description when read in conjunction with the accompanying drawings.

DETAILED DESCRIPTION OF THE PREFERED EMBODIMENTS

A description will be given of embodiments of the present disclosure with reference to the drawings.

An optical/electrical composite connector of a first embodiment of the present disclosure will be described. The optical/electrical composite connector of this embodiment is constituted by a male connector and a female connector.

Figure 1:
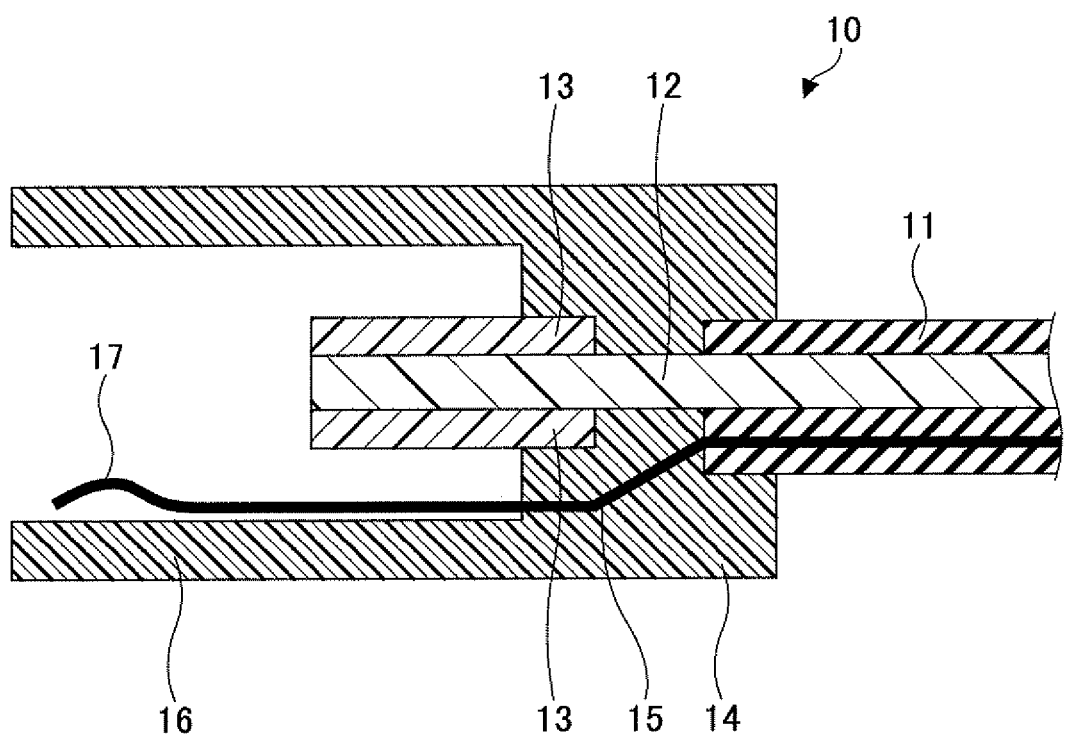
FIG. 1 is a diagram illustrating the composition of a male connector in an optical/electrical composite connector of a first embodiment of the present disclosure.

With reference to FIG. 1, a male connector 10 of this embodiment will be described.

As illustrated in FIG. 1, a composite cable 11 contains an optical fiber 12 and an electrical wire, and this composite cable 11 is connected to one side of the male connector 10. In the male connector 10, a ferrule 13 is formed at an end portion of the optical fiber 12 from the composite cable 11. The electrical wire from the composite cable 11 is connected to an electrode terminal 15 within a housing 14 of the male connector 10.

In the male connector 10, the composite cable 11 is connected to the housing 14 of the male connector 10. The housing 14 includes a hollow cylindrical part 16 on the other side of the male connector 10 which is opposite to the side thereof to which the composite cable 11 is connected. The optical fiber 12 with the ferrule 13 formed at its end portion is arranged in the middle of the internal space of the cylindrical part 16. The electrode terminal 15 is arranged to extend along an inner wall of the cylindrical part 16 of the housing 14.

The electrode terminal 15 is formed of a resilient metallic material. The electrode terminal 15 includes a contact portion 17 at an end thereof which is formed in a wave-like shape by bending. The housing 14, including the cylindrical part 16, and the ferrule 13 are formed of a resin material.

Next, a female connector 20 of this embodiment will be described with reference to FIG. 2 and FIG. 3. FIG. 3 is a cross-sectional view of the female connector 20 of this embodiment taken along the line 3A-3B indicated in FIG. 2.

Figure 2:
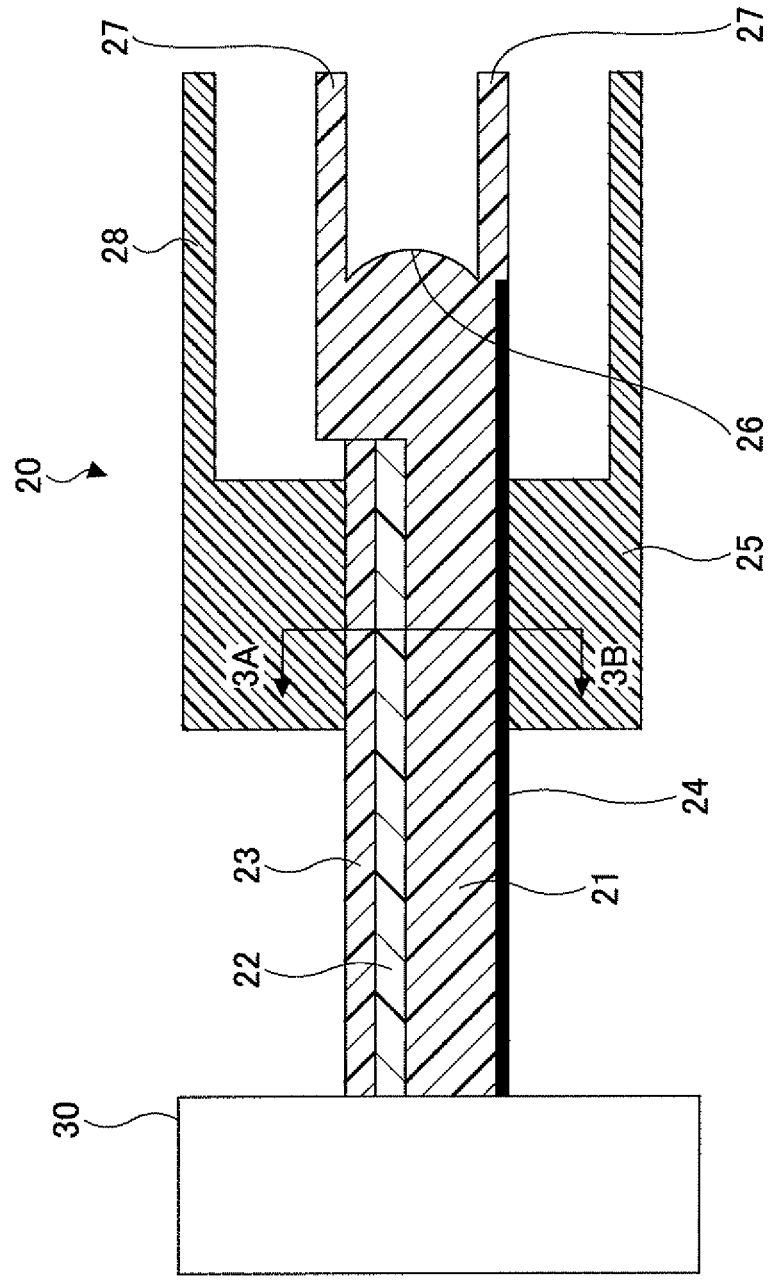
FIG. 2 is a diagram illustrating the composition of a female connector in the optical/electrical composite connector of the first embodiment.
Figure 3:
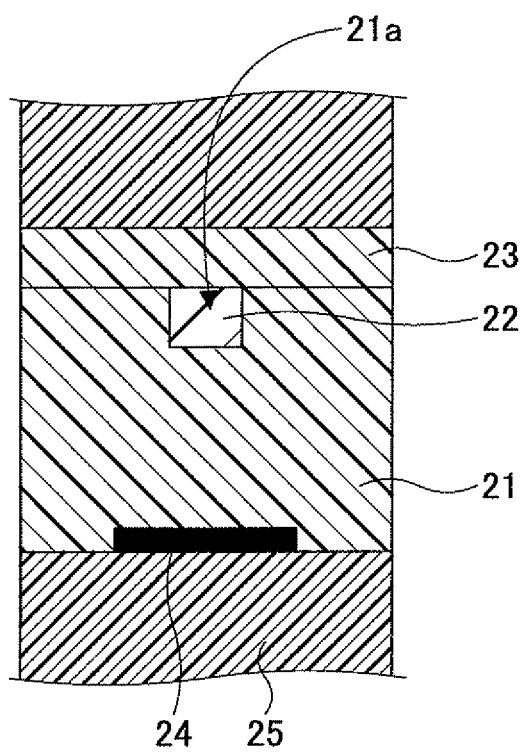
FIG. 3 is a cross-sectional view of the female connector of the first embodiment taken along a line 3A-3B indicated in FIG. 2.

As illustrated in FIG. 2 and FIG. 3, the female connector 20 of this embodiment is connected through an optical waveguide to an optical-communication device 30, such as an electrical/optical conversion module, and this optical-communication device 30 converts an optical signal into an electrical signal and vice versa. This optical waveguide is constituted by an underclad 21, a core 22 disposed in a groove 21a of the underclad 21, and an overclad 23. The underclad 21 and the overclad 23 form a cladding which covers the core 22 of the optical waveguide. An optical signal is transmitted through the core 22 of the optical waveguide. A material of the core 22 has a refractive index that is higher than a refractive index of a material of the overclad 23 and higher than a refractive index of a material of the underclad 21. An electric wiring 24 for supplying an electrical signal or power is disposed on an exposed wall surface of the underclad 21 of the optical waveguide.

As described above, the optical waveguide is connected directly to the optical-communication device 30 which performs optical communication. This optical waveguide may serve as an optical waveguide of the optical-communication device 30.

The optical waveguide is connected to the housing 25 of the female connector 20. A lens 26 is formed in the middle of an end portion of the optical waveguide, and a sleeve 27 is formed at the end portion of the optical waveguide to surround the circumference of the lens 26.

In this embodiment, the underclad 21, the lens 26, and the sleeve 27 are formed of a same resin material. These elements are formed by injection molding or the like into an integral component, which will be described later.

The housing 25 includes a hollow cylindrical part 28. An optical waveguide is disposed in the middle of the cylindrical part 28, and this optical waveguide includes the lens 26 and the sleeve 27 at the end portion thereof. The electric wiring 24 which is formed on the wall surface of the underclad 21 is exposed to the internal space of the cylindrical part 28.

The housing 25 including the cylindrical part 28 is formed of a resin material, the overclad 23 is formed of a film-like resin material, and the core 22 is formed of a resin material.

Figure 4:
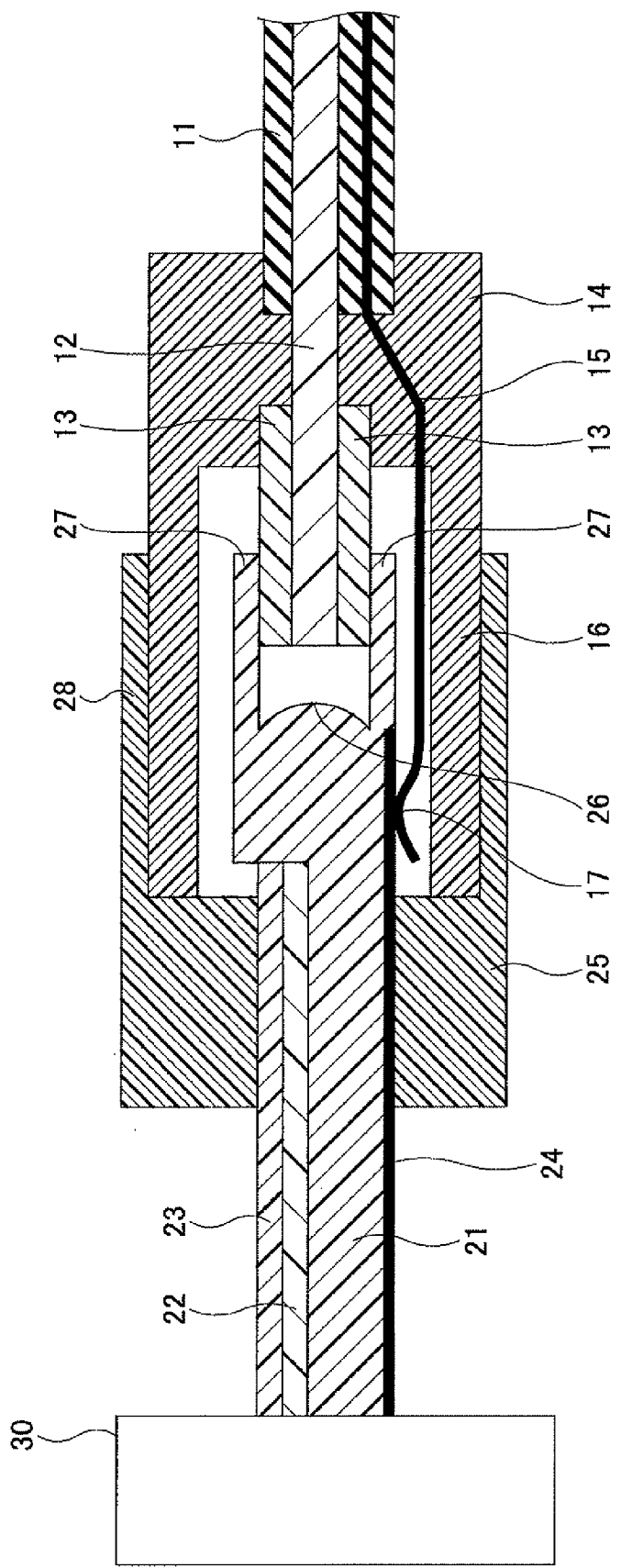
FIG. 4 is a diagram illustrating the condition in which the male connector and the female connector are connected together.

FIG. 4 illustrates the condition in which the male connector 10 and the female connector 20 are connected together.

As illustrated in FIG. 4, the male connector 10 and the female connector 20 in this embodiment are connected together so that the cylindrical part 16 of the male connector 10 is inserted in the cylindrical part 28 of the female connector 20. Specifically, in this condition, the outside wall surface of the cylindrical part 16 of the male connector 10 and the inside wall surface of the cylindrical part 28 of the female connector 20 are in contact with each other and fitted together.

At this time, the ferrule 13 of the male connector 10 is inserted and fitted in the sleeve 27 of the female connector 20. By this connection, an optical signal from the optical fiber 12 is transmitted to the core 22 of the optical waveguide via the lens 26 of the female connector 20.

For this reason, the configuration of the ferrule 13 of the male connector 10 and the configuration of the sleeve 27 of the female connector 20 are formed so that the optical signal from the optical fiber 12 may be transmitted to the core 22 of the optical waveguide at the least possible optical loss. By forming the male connector 10 and the female connector 20 in this way, an optical signal from the optical fiber 12 of the male connector 10 can be transmitted to the core 22 of the optical waveguide via the lens 26 of the female connector 20, while an optical signal from the core 22 of the optical waveguide can be transmitted to the optical fiber 11 of the male connector 10 via the lens 26 of the female connector 20.

Moreover, when the connection of the male connector 10 and the female connector 20 is made by inserting the cylindrical part 16 of the male connector 10 into the cylindrical part 28 of the female connector 20 and fitting the former into the latter, the electric wiring 24 disposed on the wall surface of the underclad 21 of the female connector 20 and the contact portion 17 of the electrode terminal 15 of the male connector 10 are in contact with each other and the electric wiring 24 and the contact portion 17 of the electrode terminal 15 are electrically connected.

By this connection, the electric wiring 24 of the female connector 20 and the electrical wire of the composite cable 11 are electrically connected. Therefore, an electrical signal from the electrical wire of the composite cable 11 can be transmitted to the electric wiring 24 of the female connector 20, while power from the electrical wire of the composite cable 11 can be supplied to the electric wiring 24 of the female connector 20.

As described in the foregoing, according to the optical/electrical composite connector of this embodiment, it is possible to make the optical fiber connection and the electric wiring connection simultaneously. Because the whole connector including the part for making the optical fiber connection is formed of a resin material, the optical/electrical composite connector of this embodiment can be manufactured with low cost.

(Manufacturing Method of an Optical/Electrical Composite Connector)

Next, a method of manufacturing an optical/electrical composite connector of a first embodiment of the present disclosure will be described.

Figure 5:
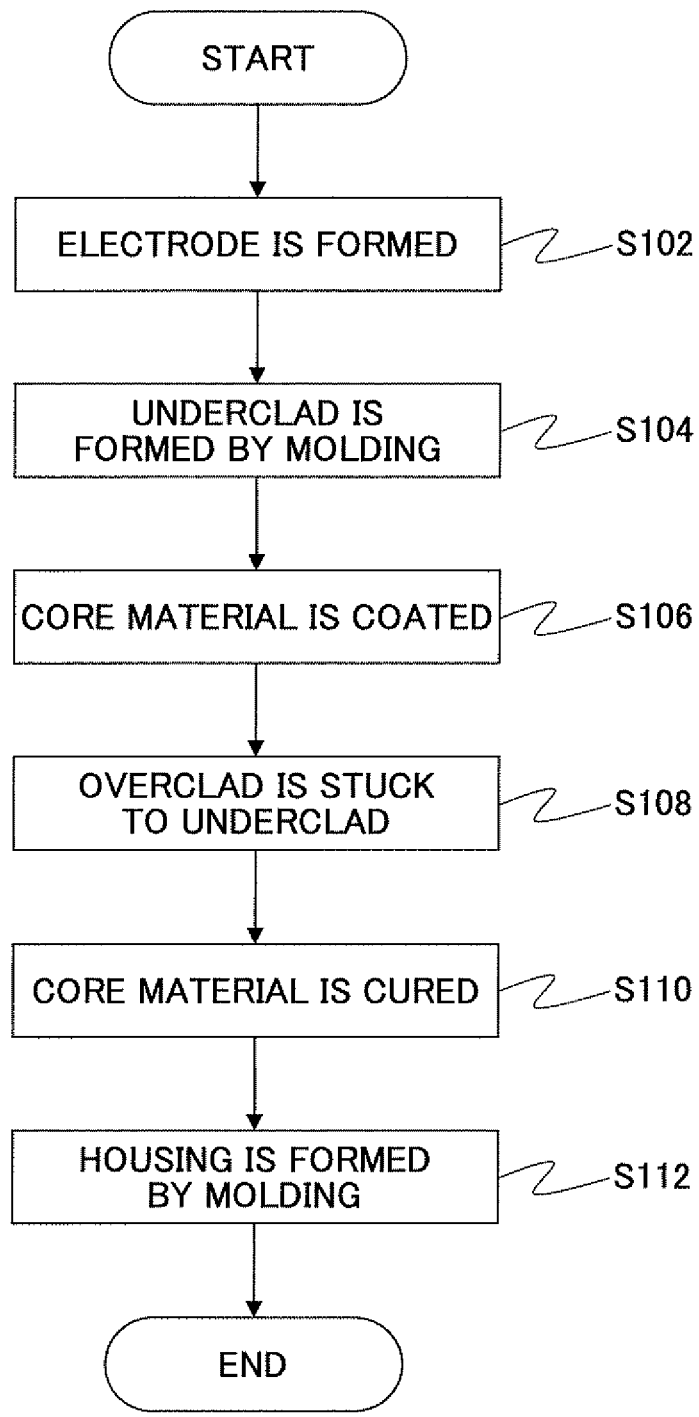
FIG. 5 is a flowchart for explaining a method of manufacturing an optical/electrical composite connector of a first embodiment of the present disclosure.

FIG. 5 is a flowchart for explaining a method of manufacturing a female connector of the optical/electrical composite connector of this embodiment.

As illustrated in FIG. 5, the electric wiring 24 is formed in step S102. Specifically, an electrode which is used as the electric wiring 24 is formed by press forming a conductive metallic material, such as phosphor bronze, and subsequently the press-formed electrode is plated with gold.

Subsequently, the underclad 21 is formed in step S104. Specifically, the electric wiring 24 formed in the step S102 is placed in a metal mold for molding the underclad 21, and resin is injected to the metal mold so that the underclad 21 is formed by injection molding. Thereby, the underclad 21 including the electric wiring 24 can be formed.

In this embodiment, the underclad 21 is formed of olefin based hydrocarbon, and the underclad 21 has a refractive index of 1.51. When the underclad 21 is formed, the lens 26 and the sleeve 27 are also formed by injection molding simultaneously.

Subsequently, the core material is coated in step S106. Specifically, the core material for forming the core 22 is applied to the groove 21a which is formed when the injection molding of the underclad 21 is performed. The core material to be applied is an ultraviolet-curing resin or a thermosetting resin. For example, the core 22 is formed of an epoxy resin and the core 22 has a refractive index of 1.56. Because the material which constitutes the core 22 has a refractive index higher than a refractive index of the material which constitutes the underclad 21 and the overclad 23, the incident light entering the core 22 passes through the inside of the core 22. The groove 21a is formed to have a square cross section, and the length of one side of the square cross section is in a range of 35-50 micrometers.

Subsequently, the overclad 23 is stuck to the underclad 21 in step S108. The overclad 23 to be stuck is a film-like material, and this overclad 23 is stuck to the underclad 21 so that the core material applied to the groove 21a is covered by the overclad 23.

In this embodiment, the overclad 23 is formed of olefin based hydrocarbon, and the overclad 23 has a refractive index of 1.51.

Subsequently, the core material is cured in step S110. Specifically, when the core material is an ultraviolet curing resin, the core material is cured by irradiating ultraviolet rays. When the core material is a thermosetting resin, the core material is cured by heating.

Subsequently, the housing is formed by molding in step S112. Accordingly, the female connector 20 of the optical/electrical composite connector of this embodiment is formed.

Because the lens 26 and the sleeve 27 in the female connector 20 of this embodiment can be formed simultaneously with the injection molding of the underclad 21, it is possible to manufacture the optical/electrical composite connector with low cost. The number of parts needed for the optical/electrical composite connector can be reduced, and the optical/electrical composite connector can be manufactured with the cost being reduced and the manufacturing time being shortened.

Next, a method of manufacturing an optical/electrical composite connector of a second embodiment of the present disclosure will be described.

Figure 6:
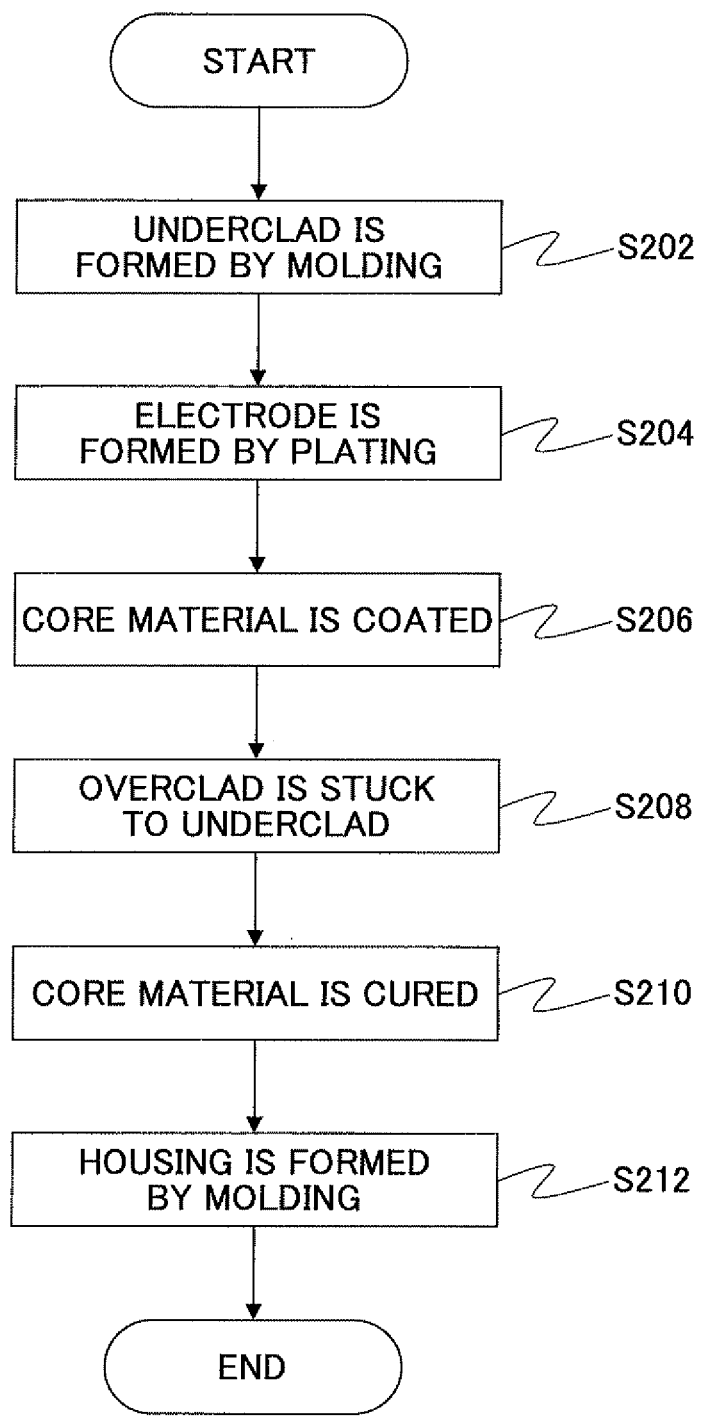
FIG. 6 is a flowchart for explaining a method of manufacturing an optical/electrical composite connector of a second embodiment of the present disclosure.

FIG. 6 is a flowchart for explaining a method of manufacturing a female connector of the optical/electrical composite connector of this embodiment.

As illustrated in FIG. 6, the underclad 21 is formed in step S202. Specifically, the underclad 21 is formed by injection molding. In this case, simultaneously with the forming of the underclad 21 by injection molding, the lens 26 and the sleeve 27 are also formed by injection molding.

In this embodiment, the underclad 21 is formed of olefin based hydrocarbon, and the underclad 21 has a refractive index of 1.51.

Subsequently, the electric wiring 24 is formed on the wall surface of the underclad 21 in step S204. This electric wiring 24 is formed by electroless plating. After copper plating is performed in a desired area of the electric wiring 24, the electric wiring 24 is plating with gold.

Subsequently, the core material is coated in step S206. Specifically, the core material for forming the core 22 is applied to the groove 21a which is formed when the injection molding of the underclad 21 is formed. The core material to be applied is an ultraviolet-curing resin or a thermosetting resin. The core material has a refractive index which is higher than a refractive index of the material which constitutes the underclad 21 and the overclad 23.

The core material is formed of an epoxy resin, and the core material has a refractive index of 1.56. Because the material which constitutes the core 22 has a refractive index higher than a refractive index of the material which constitutes the underclad 21 and the overclad 23, the incident light entering the core 22 passes through the inside of the core 22. The groove 21a is formed to have a square cross section, and the length of one side of the square cross section is in a range of 35 to 50 micrometers.

Subsequently, the overclad 23 is stuck to the underclad 21 in step S208. The overclad 23 to be stuck is a film-like material, and this overclad 23 is stuck to the underclad 21 so that the core material applied to the groove 21a is covered by the overclad 23.

In this embodiment, the overclad 23 is formed of olefin based hydrocarbon, and the overclad 23 has a refractive index of 1.51.

Subsequently, the core material is cured in step S210. Specifically, when the core material is an ultraviolet curing resin, the core material is cured by irradiating ultraviolet rays. When the core material is a thermosetting resin, the core material is cured by heating.

Subsequently, the housing is formed by molding in step S212. Accordingly, the female connector 20 of the optical/electrical composite connector of this embodiment is formed.

Because the lens 26 and the sleeve 27 in the female connector 20 of this embodiment can be formed simultaneously with the time of the injection molding of the underclad 21, it is possible to manufacture the optical/electrical composite connector with low cost. The number of parts needed for the optical/electrical composite connector can be reduced, and the optical/electrical composite connector can be manufactured with the cost being reduced and the manufacturing time being shortened.

As described in the foregoing, according to the present disclosure, it is possible to provide an optical/electrical composite connector which can make the optical fiber connection and the electric wiring connection simultaneously, with low cost.

The present disclosure is not limited to the above-described embodiments, and variations and modifications may be made without departing from the scope of the present disclosure.

The present application is based on Japanese patent application No. 2009-184321, filed on Aug. 7, 2009, the entire contents of which are incorporated herein by reference in their entirety.

What is claimed is:

1. An optical/electrical composite connector including a male connector and a female connector for making an optical fiber connection and an electric wiring connection, the male connector comprising:
  a housing;
  a ferrule provided at an end portion of an optical fiber on a side of the male connector which is connected to the female connector, wherein the optical fiber extends from a composite cable; and
  an electrode terminal formed of a resilient material and connected to an electrical wire of the composite cable, wherein the electrode terminal extends along an inner wall of the housing, and is out of contact with the optical fiber and the inner wall of the housing to be suspended in a space inside the housing, the female connector comprising:
  a core to transmit an optical signal;
  a cladding to cover the core;
  an electric wiring provided and exposed on an outer wall surface of the cladding;
  a sleeve in which the ferrule of the male connector is fitted, the sleeve being provided at an end portion of the cladding on a side of the female connector which is connected to the male connector; and
  a lens provided in the sleeve, wherein, when the ferrule and the sleeve are fitted together, the electrode terminal of the male connector and the electric wiring of the female connector are electrically connected, with the electrode terminal being in contact with the electric wiring in the space inside the housing of the male connector, and the optical fiber of the male connector and the core of the female connector are optically connected through the lens.

2. The optical/electrical composite connector according to claim 1, wherein the cladding, the sleeve, and the lens in the female connector are formed of a same resin material.

3. The optical/electrical composite connector according to claim 1, wherein the housing of the male connector includes a first cylindrical part having an opening on the side of the male connector which is connected to the female connector, the electrode terminal and the ferrule being arranged in the opening of the first cylindrical part, and the female connector includes a second cylindrical part having an opening on the side of the female connector which is connected to the male connector, the electric wiring, the lens and the sleeve being arranged in the opening of the second cylindrical part, and wherein, when the first cylindrical part is inserted in the second cylindrical part, the ferrule and the sleeve are fitted together.

4. The optical/electrical composite connector according to claim 1, wherein an optical waveguide including the core and the cladding in the female connector, and the electric wiring are connected directly to an optical-communication device which performs optical communication.

5. An optical/electrical composite connector connected to a composite cable and connectable to another connector, for making an optical fiber connection and an electric wiring connection with said another connector, the optical/electrical composite connector comprising:
  a housing;
  a ferrule provided at an end portion of the housing and is connected to an optical fiber extending from the composite cable; and
  an electrode terminal formed of a resilient material and connected to an electrical wire of the composite cable, wherein the electrode terminal extends along an inner wall of the housing, and is out of contact with the optical fiber and the inner wall of the housing to be suspended in a space inside the housing and wherein the electrode terminal is connectable to an electric wiring of said another connector exposed inside a space inside a housing of said another connector, wherein, when the optical/electrical composite connector and said another connector are fitted together, the electrode terminal and the electric wiring of said another connector are electrically connected, and the optical fiber of the connector is optically connected to an optical component of said another connector.

* * * * *